Sept. 1, 1959 R. W. KETCHLEDGE 2,902,659

MODULATING SYSTEM

Filed Dec. 14, 1953

INVENTOR
R. W. KETCHLEDGE
BY
Earl C. Laughlin
ATTORNEY

United States Patent Office
2,902,659
Patented Sept. 1, 1959

2,902,659

MODULATING SYSTEM

Raymond W. Ketchledge, Whippany, N.J., assignor to Bell Telephone Laboratories, Incorporated, New York, N.Y., a corporation of New York Application December 14, 1953, Serial No. 398,115
8 Claims. (Cl. 332—47)

Figure 1:
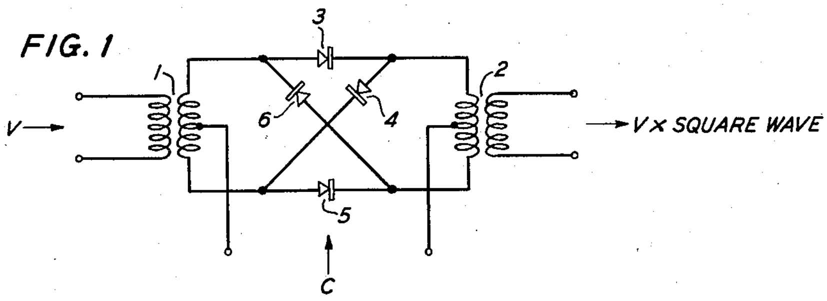

This invention relates to a carrier wave signaling system, and particularly to a method of and arrangements for effecting modulation in such a system.

The invention is more specifically directed to improvements in switching type modulators such as are used in carrier signaling systems for modulating a high frequency carrier wave with a signal comprising a band of frequencies, for example, the video frequencies in a television signal, to produce a signal-modulated carrier wave for transmission, or for re-translating the carrier frequency spectrum of such a signal-modulated carrier wave back to the original band of signal frequencies. A switching type modulator may be defined as one which is adapted to multiply an input signal by the factor 1, 0, −1. One example is the conventional double-balanced or bridge modulator. Such a modulator when driven by a carrier signal of sufficient amplitude is adapted to produce an output consisting of the input signal alternatively multiplied by the factor +1 or −1. The action of the carrier wave in such a modulator is simply to reverse the polarity of the supplied signal wave in accordance with the polarity reversals of the carrier wave. This modulator, therefore, operates to multiply an input signal of frequency V by a square wave function having the period of the particular carrier frequency C. Since the square wave contains all odd harmonic multiples of the carrier frequency, its multiplication by the input signal results in an output wave containing the modulation products C±V, 3C±V, 5C±V, etc.

A general object of the invention is to improve a modulator of the switching type, particularly from the standpoint of preventing production thereby of undesired modulation products of the waves applied to its signal and carrier inputs.

A more specific object is to effectively eliminate in a simple and economical manner from the output of a switching type modulator certain undesired higher order modulation products of the waves applied to its signal and carrier inputs, without unduly affecting the desired modulation products of these waves appearing in the output of the modulator.

These objects are attained in accordance with the invention by proper control of the wave shape of the modulating function of the switching type modulator, for example, by employing well-known pulse forming and shaping equipment to convert the switching function of the modulator from a square wave to a series of spaced pulses such that the harmonics or modulation products to be suppressed are effectively removed from the modulating function. The pulse shaping apparatus for accomplishing this result, for example, may comprise a properly actuated "gating" circuit in cascade with the signal input circuit or signal output circuit of the modulator, operating as an additional modulation step; or in cascade with the carrier input circuit of the modulator.

One known method for removing undesired modulation products from the output of a switching type modulator involves proper control of the generation of the undesired products in a separate, like modulator and the application of the output of this second modulator to the output of the first modulator in such amplitude and phase relation with respect thereto as to effectively cancel out the undesired modulation products. The method of the invention differs essentially from these prior art methods in that it employs a multiplication process rather than conventional addition processes.

Figure 2:
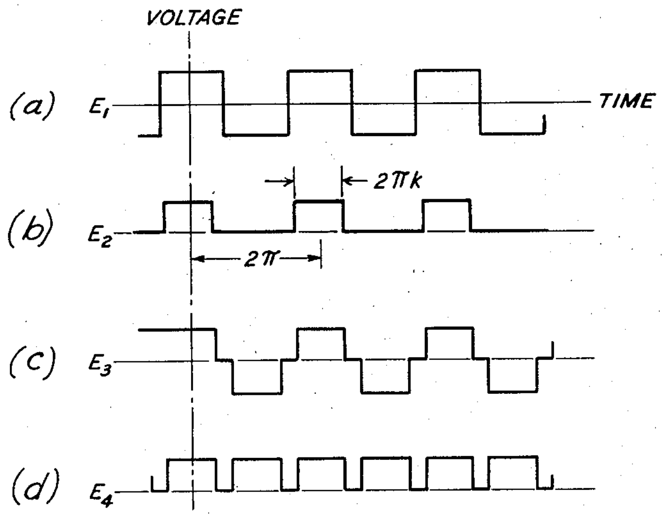
Figure 3:
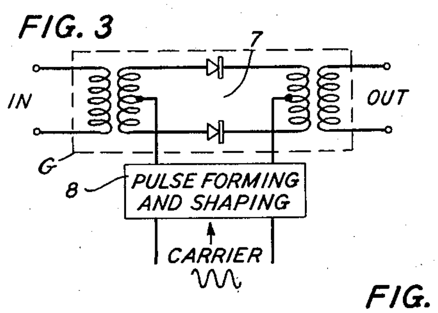
Figure 4:
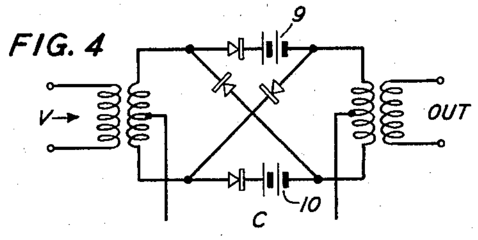
Figure 6:
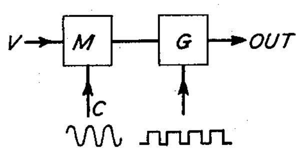
Figure 7:
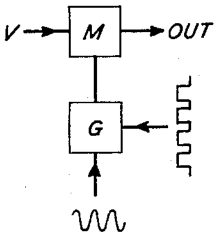
Figure 5:
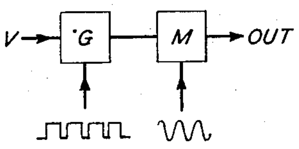

The various objects and features of the invention will be better understood from the following detailed description thereof when read in conjunction with the accompanying drawing in which:

Fig. 1 shows schematically the circuit of one form of switching type modulator to which the invention may be applied;

Figs. 2(*a*) to (*d*) show a group of curves illustrating different idealized wave forms which are made use of, in connection with the following detailed description of the modulating arrangement of the invention, to explain more clearly how the component elements thereof operate to produce the desired result;

Fig. 3 shows schematically one simple type of gating circuit which may be used with the switching type modulating arrangement of Fig. 1, in accordance with the invention, to produce the desired control of the modulating function thereof;

Fig. 4 shows schematically another arrangement, in accordance with the invention, for producing the desired control of the modulating function of a switching type modulator; and Figs. 5 to 7 respectively show in block diagrammatic form three other alternative arrangements in accordance with the invention each including a gating circuit for producing the desired control of the modulating function of a switching type modulator.

One known form of switching type modulator to which the invention is applicable, illustrated in Fig. 1, commonly referred to as a double-balanced or bridge modulator, is disclosed in the United States patent to F. A. Cowan, No. 2,025,158, issued December 24, 1935. As indicated, it includes an input transformer 1, an output transformer 2 and four varistors 3, 4, 5 and 6 connected in a bridge arrangement between the two transformers. The signal and carrier waves to be combined by modulation in this modulator are applied thereto in conjugate relation with respect to each other and to the output of the modulator, as indicated, by proper connection of their respective sources and the modulator output circuit through windings of the two transformers to the bridge, and the modulation products of the combined waves are taken off through the output transformer 2. Since the modulator operates to multiply the input signal of frequency V by a square wave function having the period of the particular carrier frequency C, and the square wave contains all odd harmonic multiples of the carrier frequency, the output wave will contain the modulation products C±V, 3C±V, 5C±V, etc., some of which may be present in undesirable magnitudes and in the case of video transmission, at least, may result in considerable picture distortion because of overlapping between the low frequencies in the third harmonic spectrum with the high frequencies of the fundamental spectrum.

The manner in which the undesired higher order (say, third order) modulation products are effectively removed from the output of this modulator in accordance with the invention without the necessity of using filters, may be best explained by the following mathematical analysis with reference to the curves of Fig. 2, the discussion being restricted to modulating devices which multiply by the factors 1, 0 and −1.

Consider a square voltage wave such as shown at $E_1$ in Fig. 2(*a*). This wave may be represented by a Fourier series of the form $$\frac{1}{n}\text{ cosine } nx \qquad (1)$$

where $n=1, 3, 5, 7$, et cetera, and $x$ is the angular displacement in time of the fundamental frequency from its origin. This wave contains all the odd harmonics of the fundamental frequency. If it is desired to prevent the production of particular high order products in the output of a switching type modulator, it is quite apparent that the input signal must be multiplied by a wave which does not contain the particular harmonic. Consequently, if the third harmonic is to be eliminated, the multiplying wave should not contain the third harmonic.

Consider the voltage wave indicated at $E_2$ in Fig. 2(*b*), which consists of a series of pulses which may be represented by a Fourier series in the form $$\frac{1}{m}\text{ sine } \pi mk \text{ cosine } mx \qquad (2)$$

where $m$ is an integer 1, 2, 3, 4, 5, 6, et cetera, and $k$ is the ratio of the on-interval of the pulses to the repetition period thereof. It is apparent that this wave will contain no third harmonic if the condition sine $3\pi k=0$ is satisfied, which requires $\pi k$ to be equal to ⅓, ⅔, et cetera, which corresponds to angles of 60°, 120°, et cetera. If therefore, two such waves are added in opposite polarity with a 180° phase shift of the fundamental frequency, a voltage wave of the form $E_3$ shown in Fig. 2(*c*), is obtained, in which all even harmonics are removed but the odd harmonics add.

Thus, the wave $E_3$ may be represented by a Fourier series of the form $$\frac{1}{n}\text{ sine } n\pi k \text{ cosine } nx \qquad (3)$$

where $n=1, 3, 5, 7$, et cetera. With the value of $k$ chosen to remove the third harmonic, the multiplication of this wave shape $E_3$ with the input signal will yield an output product which does not contain the component $3C\pm V$ but does contain the desired $C\pm V$ component. This wave shape may be obtained by a variety of pulse forming and shaping circuits. For example, if the output of the square wave modulation process is multiplied by a "gate" function shown at $E_4$ in Fig. 2(*d*), the overall modulation process will be the multiplication of the input signal by the function shown at $E_3$ in Fig. 2(*c*). By "gate" is meant a circuit which multiplies a given input signal by either 0 or 1 according to the amplitude of an applied control signal. Thus the transmission or nontransmission of the input signal to a load circuit is determined solely by the control signal. Therefore, to realize physically a bridge modulator having no $3C\pm V$ output, the modulator must be combined with a properly actuated gate of the form shown idealized at $E_4$ in Fig. 2(*d*). This gating circuit G may, for example, be of the simple type shown in Fig. 3, including a vario-losser 7, which differs from the bridge modulator of Fig. 1 merely in the elimination of the two cross-connected varistors 4 and 6 therefrom, the impedance values of the remaining varistors 3 and 5 being controlled by a carrier signal in much the same way as a bridge modulator, through suitable pulse forming and shaping equipment indicated by the box 8, to produce a wave of the general form shown at $E_4$ in Fig. 2(*d*). The pulse forming and shaping equipment 8 in the gating circuit of Fig. 3 for example, may comprise a known type of biased rectifier circuit operating on the carrier waves of frequency C and sine wave form which are also supplied to the bridge modulator in Fig. 1. The equipment 8 of Fig. 3 is adapted for producing at its output terminals a series of intermittent pulses of form $E_4$ in Fig. 2(*d*), which pulses would be applied to the vario-losser 7 of the gating circuit of Fig. 3 to produce the desired gating operation on the input signal V. Other pulse forming and shaping equipment of the multivibrator and blocking oscillator type suitable for alternative use in the gating circuit of Fig. 3 are disclosed in chapters 5 and 6 of a book entitled "Wave Forms" by Chance et al. (volume 19 of the M.I.T. Radiation Laboratories Series) published in 1949.

Alternatively, the modulating function, indicated at $E_3$ in Fig. 2(*c*), may be realized by proper modification of the circuits of a bridge modulator, without the use of an auxiliary gating circuit, as shown in Fig. 4, by the use of batteries 9 and 10 in the series varistor arms to provide suitable direct current biases on the bridge varistors together with the use of a carrier voltage applied to the carrier input of the modulator of appropriate amplitude relative to the amplitude of the direct current biasing voltages.

Figs. 5, 6 and 7 respectively show in block diagrammatic form three alternative ways of combining a switching type modulator M and a gating circuit G such as shown in Fig. 3, for removal of the $3C\pm V$ modulation product from the output of the modulator. In Fig. 5, the gating circuit G, adapted for changing the wave applied to its input to the form indicated at $E_4$ in Fig. 2(*d*), is shown as inserted in the signal input to the modulator M supplied with the same carrier wave and in Fig. 6 as inserted in the signal output from the modulator M. Since the function desired is the product of the input signal times the gate function times the carrier square wave, it makes no difference in what order the three factors are multiplied. Consequently, the gate may be located on the signal input or the output side of the modulator without affecting the overall operation of the circuit. The action of the gate circuit G is not analogous to that of a filter but rather represents an additional step of modulation. Since the insertion of the gate multiplies the product of the square wave and the input signal by a complex wave having a 2C fundamental frequency, the array of output products from this two-step modulation process does not include the $3C\pm V$ product in the case described above. Alternatively, the gate G may be located in the carrier input to the modulator M as indicated in Fig. 7.

It is quite apparent that by means of the general design technique discussed above the process of the invention may be extended to eliminate other modulation products from the output of a switching type modulator or even groups of products. For example, several gates may be cascaded to remove several different modulation products. Various other modifications of the circuits which have been illustrated and described which are within the spirit and scope of the invention will be apparent to persons skilled in the art.

What is claimed is:

1. The method of suppressing an undesired predetermined harmonic modulation product in the output of a nonlinear impedance element bridge modulator, which comprises modulating a signal voltage in the modulator substantially with a square-wave function represented by the carrier voltage to produce an undesired modulation product of a predetermined harmonic order of the carrier voltage in the modulator output, and further modulating said square wave modulating function by a unidirectional pulsed gating signal to suppress the undesired predetermined carrier harmonic modulation product in the modulator output, said pulsed gating signal having an on-interval exceeding half the recurrent period thereof.

2. The method according to claim 1 which includes deriving said pulsed gating signal from the carrier voltage in an additional step of modulation.

3. In a nonlinear impedance element bridge modulator having its opposite diagonals connected to a signal wave source and a carrier wave source, respectively and a load circuit, said modulator producing in said load circuit an undesired modulation product of a predetermined harmonic order of the carrier voltage, and means for suppressing the undesired predetermined harmonic product in said load circuit comprising means to supply in circuit with one of the bridge diagonals unidirectional voltage pulses related to the carrier voltage and having a preselected duration and spacing such that the pulse duration is substantially longer than the pulse spacing.

4. The modulator according to claim 3 in which said voltage pulse means is connected in series with said carrier source across the diagonal of said modulator.

5. The modulator according to claim 3 in which said voltage pulse means is connected between said modulator and load circuit.

6. The modulator according to claim 3 in which said voltage pulse means is connected between said signal source and modulator.

7. In a modulator circuit comprising a plurality of non-linear impedance elements connected in a series-aiding relationship in a Wheatstone bridge, a source of signal waves connected to one bridge diagonal, an output circuit connected across the other bridge diagonal, and a source of carrier waves connected to said one and other bridge diagonals in conjugate relationship to both said signal source and output circuit, said carrier waves tending to establish substantially a square-wave switching function for said modulator circuit for producing undesirable harmonic modulation products of the carrier wave in said output circuit, means for multiplying said square-wave switching function by a further modulating function for producing a series of pulses having a predetermined time duration and a predetermined time spacing therebetween comprising a gating circuit connected between said carrier source and said one and other bridge diagonals, a source of gating pulses recurring at twice the frequency of said carrier wave and having an on-interval exceeding half the recurrent period thereof, and means for connecting said gating source to said gating circuit.

8. A bridge modulator comprising a signal wave source, a carrier wave source, a load circuit, and a gating circuit, said signal source and load circuit being connected to opposite diagonals of said bridge modulator, said gating circuit being connected in series with said carrier source between said opposite bridge diagonals in conjugate relation to said signal source and load circuit, said gating circuit comprising means for providing a pulse voltage wave related to said carrier wave and composed of periodically recurring unidirectional pulses each pulse having a preselected time duration, said pulses having also a predetermined time spacing therebetween substantially shorter than said time duration.

References Cited in the file of this patent

UNITED STATES PATENTS

| | | |
|---|---|---|
| 2,225,697 | Hussey | Dec. 24, 1940 |
| 2,293,628 | Reiling | Aug. 18, 1942 |
| 2,387,652 | Dickieson | Oct. 23, 1945 |
| 2,438,948 | Riesz | Apr. 6, 1948 |
| 2,455,732 | Carter | Dec. 7, 1948 |
| 2,462,093 | Grimes | Feb. 22, 1949 |
| 2,519,763 | Hoglund | Aug. 22, 1950 |
| 2,563,406 | Goldberg | Aug. 7, 1951 |